United States Patent [19]

Grafe et al.

[11] Patent Number: 4,480,308
[45] Date of Patent: Oct. 30, 1984

[54] TEXT PROCESSING SYSTEM WITH COMMUNICATION DATA SAVE FACILITY

[75] Inventors: Robert J. Grafe; Gary E. Leikam, both of Austin, Tex.

[73] Assignee: International Business Machines Corporation, Armonk, N.Y.

[21] Appl. No.: 440,400

[22] Filed: Nov. 9, 1982

[51] Int. Cl.³ .............................................. G06F 1/00
[52] U.S. Cl. ................................................ 364/200
[58] Field of Search ..................... 364/200 MS FILE

[56] References Cited

U.S. PATENT DOCUMENTS

| | | | |
|---|---|---|---|
| 3,686,641 | 8/1972 | Logan et al. | 364/200 |
| 3,974,480 | 8/1976 | Gernelle | 364/200 |
| 4,272,819 | 6/1981 | Katsumata et al. | 364/200 |

FOREIGN PATENT DOCUMENTS 0067957  12/1982  European Pat. Off. .

Primary Examiner—Raulfe B. Zache
Attorney, Agent, or Firm—J. B. Kraft

[57] ABSTRACT

In a text processor including a communications facility, different tasks, such as typing tasks and communications tasks are entered into the machine from different program diskettes. As each is so entered, in view of the fact that main memory space is limited, it overlays control data in the main memory relating to the previous task. In a communications session, the operator has to build a queue of documents for sending under the control of communications foreground control (CFC) and communications background control (CBC) blocks in the main memory. If the operator is required to terminate this task before its completion, his queue data is lost as it is overlaid by control data relating to a new task that is entered, so on return to the communications task, he has to start from the beginning. In order to enable him to exit the communications task without losing the queue data, an arrangement is employed whereby this data can be entered on to the communications program diskette prior to termination of a communications session.

8 Claims, 4 Drawing Figures

4,480,308

TEXT PROCESSING SYSTEM WITH COMMUNICATION DATA SAVE FACILITY

TECHNICAL FIELD

The present invention relates to text processing systems, and in particular to such systems incorporating communications facilities.

BACKGROUND ART

Text processing systems may, in general, be characterized as digital data processing systems with limited processing and storage facilities, but good operator interactive facilities, whereby text entered into the system by a keyboard can be manipulated by reference to a display. Preferably they include high quality printing arrangements. One such system is the Displaywriter System which is marketed by International Business Machines Corporation.

The basic function of such is to produce documents, but, as they are arranged for operator interaction, such documents are prepared, displayed and if necessary modified and corrected before printing. In addition, many now include communications facilities which allow documents to be transmitted to other locations in the form of digital data. Such transmissions may be of an interactive on-line type to enable single message conversational interconnection of systems and their operators or of the batch processing type in which a number of documents or messages are transmitted in a single operation. The present invention relates to the latter type of operation, which in the context of text processors is called 'electronic data distribution' or often 'electronic mail'.

In order to prepare for batch communication, the documents for transmission have to be identified and ordered prior to transmission in order to effect orderly and efficient operation during a transmission session. Thus, the operator has to enter a number of factors, such as those relating to the address or addresses of the recipients, the communication controls identifying the line types, the transmission mode, and a queue of document names and their location within the system. This can take time.

A problem arises when, during the preparation for transmission, the operator needs to perform a further task on the system. Due to the fact that RAM storage in text processing systems is limited in size, each task when entered, overlays the task previously entered into storage. Thus data relating to the previous task is lost. Thus, the operator has the choice either of exiting from the communications task to process the new task and thereafter starting the communications preparation again or finishing the communications task before starting the new task.

DISCLOSURE OF THE INVENTION

The present invention is directed to overcoming the above problem by allowing communications preparation data to be saved should an operator need to exit from a partially completed communications preparation operation. Accordingly the present invention provides a text processor system including a main memory, communications means for transmitting messages through a communications line and a storage unit for loading data, from storage elements mountable therein, into the main memory, said data including a communications control program contained on a communications control storage element, and including means for developing a queue of messages to be communicated from the system in response to operator entries under the control of said communications control program and means responsive to interruption of the queue development to cause transfer of data defining the queue to the communications control storage element.

BEST MODE FOR CARRYING OUT THE INVENTION

Figure 1:
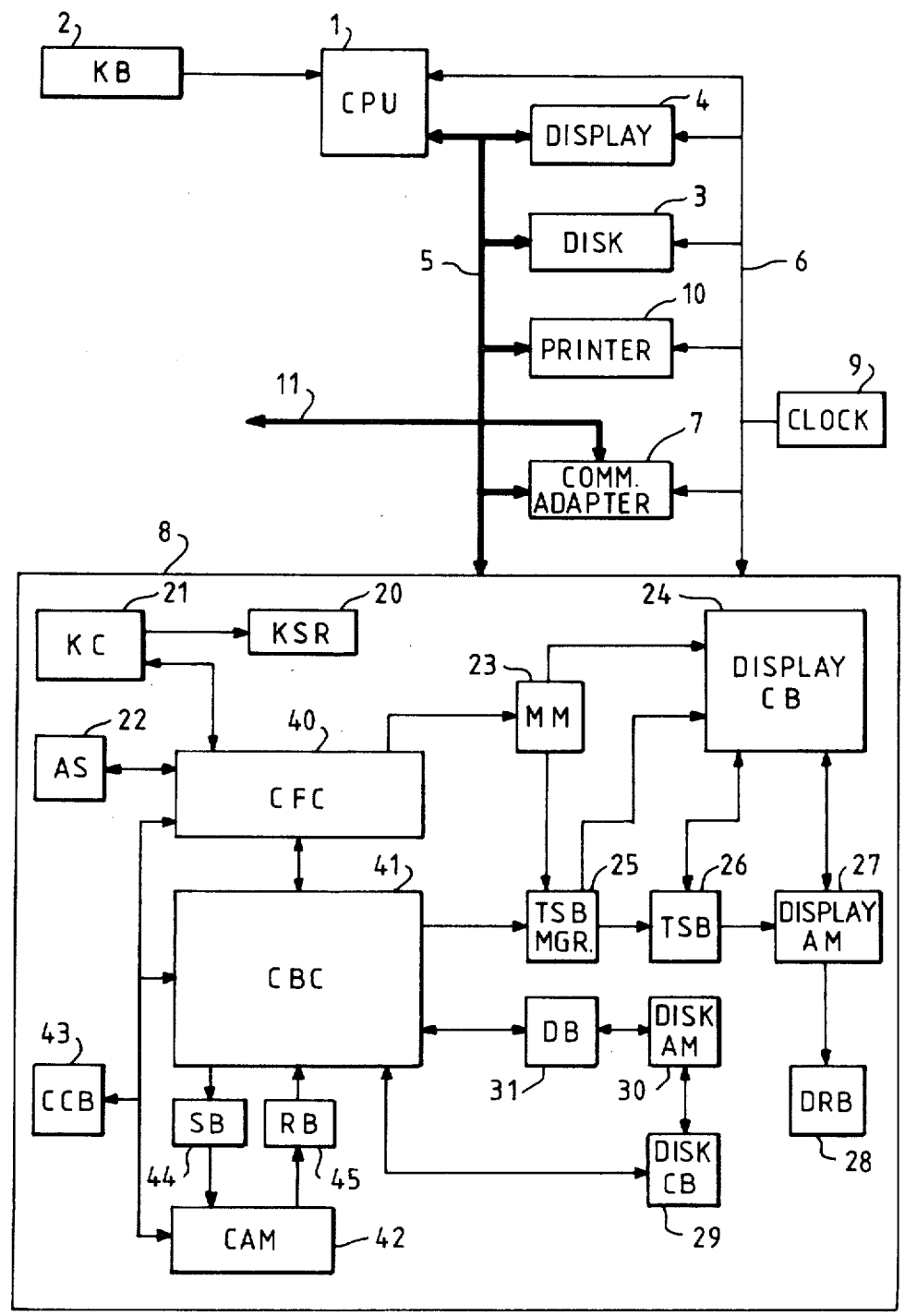
FIG. 1 is a block diagram of a text processor embodying the present invention.

FIG. 1 is a block diagram of a text processing system having a communications facility. A central processor 1 has connected thereto a keyboard 2 for the reception of operator entered commands and data. A bus 5 interconnects a display unit 4, a diskette drive 3, a printer 10, a volatile store 8 and the central processor 1 for the transfer of control and informational data therebetween. A communications adapter 7 is coupled to bus 5 for communicating with further systems, which may or may not be similar to the FIG. 1 system, through communication lines 11. A clock 9 delivers timing signals to the CPU, diskette drive, printer, communications adaptor and store through lines 6.

In use, the system guides an operator through the steps necessary to prepare and complete a job by means of menus displayed on display device 4 from which he is directed to choose items required for that job. Examples of the menus will be described in more detail later, but firstly a simple task routine will be described.

Let us assume that an operator wishes to revise an existing document in the system. On switching the system on, a base diskette is placed into drive 3 and the data therefrom is read into store 8 to initially set up the system. The result of this initial set up is the appearance on the display of a task selection menu indicating a number of tasks, each accompanied by an identity letter. At the bottom of the menu there is a prompt for the operator to type in the identity letter of the desired task and press the enter key. One of the items which may he selected relates to typing tasks, so the operator keys in the related identity letter and depresses the enter key. This results in a displayed prompt to insert a further program diskette relating to typing tasks into the drive. Upon such insertion, the typing task program is entered into memory 8 to set up the machine for typing tasks. This results in the display of a new menu which gives the operator the choice of, for example, creating a new document or revising a previously entered document, again with an identity letter for each choice. Upon selection of, for example, the revise option, a prompt first asks for the document name, and, after entry of that name, the name of a work diskette containing the document. A further prompt then calls for the insertion of the named work diskette, after which the material on the named document on that diskette is displayed. After revision of the document, the original task selection menu is again displayed for selection of a further job to be performed.

At this point, it should be noted that in the above procedure, three diskettes were employed. The first two related to the initial setting up of the system and the setting up of a specific task and the third was employed to retain data related to the task. Thus the first two contained fixed program data and the third contained work data which was, in fact, altered during the task.

The present invention is applicable to tasks relating to communications operations. In order to prepare for the transmission or reception of documents or other messages, the procedure up to task selection is the same as above The displayed task selection menu, for all tasks is as follows:

| TASK SELECTION | | |
|---|---|---|
| ID | ITEM | |
| a | Typing Tasks: Create, Revise or Paginate Documents | |
| b | Work Diskette Tasks: Delete or Duplicate Documents, Duplicate, Condense or Erase/Initialize (Name) Diskette, Print Index of Diskette Contents, Change Document or Diskette Name, Recover Documents | |
| c | Program Diskette Tasks: Default Formats, Duplicate Setups, Printer and Work Station Description, Duplicate and Erase Program Diskette | |
| d | Spelling Tasks | |
| e | Feature Tasks | |
| f | Merge Tasks | |
| Type ID letter to choose ITEM; press ENTER: | | |

Communications tasks come under the heading of Feature Tasks, so option e is selected. The system responds by displaying the message 'Insert desired feature diskette; press ENTER'. In order to effect a communications setup, the operator now inserts an Electronic Data Distribution (EDD) program diskette.

This diskette provides the controls for the communication function, and the resulting layout of memory 8 is as shown in FIG. 1. In this layout, certain functions and controls are derived from the base diskette. These are:

Keystroke Service Routines (KSR) 20 which handle commands from the CPU in response to each keyed entry from keyboard 2.

Keystroke Control (KC) 21 which controls the service routines;

Application Supervisor (AS) 22 which controls the linking of application routines to the base routines of the system;

Menu Manager (MM) 23 which controls the generation of displayed menus in response to control signals from either the base or the application controls;

Display Control Block (Display CB) 24, which effects display control functions;

Text Storage Block Manager (TSB Mgr.) 25, which controls the storage and flow of text data in the system;

Text Storage Block (TSB) 26, which stores entered text data;

Display Access Method (Display AM) 27, which determines the display data format and control;

Display Refresh Buffer (DRB) 28, which holds data for display;

Diskette Control Block (Disk CB) 29, which controls diskette read and store functions;

Diskette Access Method (Disk AM) 30, which determines the diskette data format and control; and Diskette Buffer (DB) 31, which holds data to be stored in, or read from, a diskette in drive 3.

The remaining functions and controls are derived from the EDD communications diskette, these are:

Communications Foreground Control (CFC) 40, which essentially controls functions related to interaction between the operator and the system during communications sessions;

Communications Background Control (CBC) 41, which provides housekeeping controls in conjunction with the controls effected by CFC 40;

Communications Access Method (CAM) 42, which determines the format of signals and controls for the communications adapter 7;

Communications Control Block (CCB) 43, which is coupled to CFC 40, CBC 41 and CAM 42 to effect overall control of communications activities;

Send Buffer (SB) 44, which stores data to be sent from communications adapter 7; and Receive Buffer (RB) 45, which stores data received by communications adapter 7.

It should be noted here that the EDD diskette has to be personalized for the system with which it is used and the communications network to which the system is connected. This is normally done on installation of the machine. This personalization includes details of the addresses or identities of other systems coupled to the network, the types of lines and modems used for routes through the network, data codes employed and the format of transmitted data. It is assumed here that the EDD program diskette read into the system has been so personalized.

After the diskette has been loaded, a SETUP selection menu is presented to the operator from the communication foreground control (CFC) 40 via the menu manager (MM) 23 and the display controls and buffer to the display. This menu is of the form:

| ID | SETUP NAME | TASK |
|---|---|---|
| a | D4 MAIL | DD (Network Document Distribution) |
| b | D6 MAIL | DD (Network Document Distribution) |
| c | DALLAS | DX (Document exchange) |
| d | D7 MAIL | DD (Network Document Distribution) |
| e | TUCSON | DX (Document exchange) |
| f | (unused) | |
| g | (unused) | |
| h | (unused) | |
| i | Save Session Preparation and Go to Task Selection | |
| j | Go to Task Selection | |
| Type ID letter to choose ITEM, press ENTER: | | |

This menu directs the operator to select the address or network with which he wishes to communicate so that he can build a queue of documents for that address or network. Identities a, b and d relate to the distribution of messages, through a host system, to multiple addresses in a network, and identities c and d relate to the exchange of messages between the system and another single address. Identities i and j are employed if the operator wishes to exit from communication tasks to a further task. Identity i will be described in detail later, as it is this function to which the present invention relates.

If the operator wishes to effect communication within, say, the D4 MAIL network, he enters 'a', end a session summary frame relating to D4 MAIL is produced on the display. Essentially, this sets out all the messages communicated to, and received from, the address defined by the setup name. The session summary frame starts as follows:

| Communication |  |
|---|---|
| SETUP : D4 MAIL (DD) | ATTENDED |

When ready to communicate, press COMM START
To display or change command queue or session options, press REQST.

As no messages are yet being transmitted or read to be transmitted, the operator enters REQST. This causes a request task frame to appear as follows:

| ID | REQUEST TASK ITEM |
|---|---|
| a | Distribute Document |
| b | Obtain Documents |
| c | Display Index of Diskette Contents |
| d | Display or Change Command Queue |
| e | Change Session Options |

To enter a document to be sent into the send queue, the operator enters 'a' and is then prompted to insert the identity of the document and the name of a work diskette holding that document. Subsequent to such entry the request task menu is again displayed.

As indicated in the request tasks menu, the operator may perform other tasks, such as obtaining documents which are addressed to the system and received by the host system, displaying an index of the contents of the named work diskette, displaying items from the queue of commands scheduled for processing during the communications task, and changing the options available to the communications session.

With the selection of Identity a from the REQUEST TASKS MENU, destination addresses for the named document can be entered using a DISTRIBUTION LIST menu as follows:

| | DISTRIBUTION LIST | |
|---|---|---|
| ID | NODE | DESTINATION ADDRESS(ES) |
| a | | |
| b | | |
| c | | |
| d | | |
| e | | |
| f | | |
| g | | |
| h | | |
| i | | |
| j | | |

By calling the various Identities a through j, a pattern of addresses for the named document can be built up. The nodes define host systems within a network to which individual systems are attached and may be equated to telephone area codes. The destination addresses refer to the addresses of the individual systems to which the document is to be sent. For each node, a plurality of destination addresses, for example, 8, may be entered. When the operator enters an identity, he is prompted to type the node and destination addresses, and then to press the ENTER key, when the typed information is entered into the list and displayed. This process is continued until the full list is prepared for the named document. The process is then repeated for further named documents to be distributed.

When a completed queue of messages has been built up, the operator establishes a connection with the host system to which his system is connected, recalls the session summary frame and depresses a COMM. START (communication start) key. During the communication session, the session summary frame provides a summary of active messages as follows:

| SETUP: | D4 MAIL | ATTENDED | 123/4567 |
|---|---|---|---|
| DISTRIBUTE DOCUMENT | | | |
| Document Name: JUNO | | | |
| Diskette: ROCK | | | |
| Document Comment: Patent Search Report | | | |
| Destination Address(es): 282 35 D 782 | | | |
| Document Attributes: Acknowledge Delivery | | | |
| Priority Delivery | | | |

This indicates that a document JUNO on a diskette ROCK is ready for distribution to the defined destination addresses from the system. The system's address is shown as 123/4567. As has been mentioned above, various options may be selected for each document, and the document attributes show those which have been chosen.

When the host to which the system is attached receives this document, it allocates a further name to it and returns this name for display in the session memory frame as follows:

Distribution Document Name: 78753 DIS 0123

This acknowledges that the document is in the system and has, or will be distributed.

For received documents, the session summary frame format is as follows:

| SETUP: | D4 MAIL | ATTENDED | 123/4567 |
|---|---|---|---|
| OBTAIN DOCUMENT | | | |
| Distribution Document Name: 78753_DIS_0637 | | | |
| Receive Message: | | | |
| Recipient Local Address: 4567 | | | |
| Distribution Document Name: 78753_DIS_0637 | | | |
| Source Address: Smith | | | |
| Document Name: Pers. 024 | | | |
| Diskette: ROCK | | | |
| Document Comment: Personnel Policies | | | |
| Successful Completion | | | |

This indicates reception of a document. It shows both the original document name (Pers. 024) and the name assigned by the distribution system (78753 DIS 0637), together with the address of the source of the document and comments on the document prepared at the source.

Obviously, during a communications session, a number of documents can be sent and received for each setup.

When a communications session has been completed, the operator depresses an END key and then gets the Task Selection Menu for further work on a selected task.

It should be noted that though the communication operation itself takes a relatively small time, the preparation for this operation may be quite extensive. As has been seen, for each communications setup, a queue of messages has to be built up from those available on a work diskette, in order to be placed in the queue, each message has to be defined and entered by means of the SETUP and Request Task menus. This in many cases will require references to the send queue and diskette ontent index by menu selection together, possibly, with changes in communication session options.

Furthermore, due to the fact that in a text processing system, the memory (8 FIG. 1) is small, communications applications are implemented as foreground feature overlay tasks (in the communication foreground control (CFC) 40 of FIG. 1). Each of the tasks set out in the Task Selection Menu above involves a program load operation from an appropriate program diskette to memory 8. Thus, any specific current task information held in memory 8 is overlaid, and therefore lost, when a new task is entered. In the case of a communications task, the send queue data and selected option data are so overlaid and lost. This means that once a communications task has been selected, then it must either proceed to completion, or, if interrupted, it must be later started from the beginning. For many tasks, this raises no significant difficulties, however, as explained above, a communications task, especially one employing a long queue of messages, may take a lengthy period in preparation.

Logically, the best time to effect communications is at or near the end of a working day, when the messages to be sent have been prepared during the day. Unfortunately, it is at this very time that urgent mail often arrives for typing. Thus, an operator, having started his preparations for a communications session, has to decide whether to continue therewith, or to exit from this task to prepare an urgent letter. In either case, it is clear that office efficiency is impaired.

One way of solving this problem would be to implement the communications facility as a concurrent background task. In other words, having entered the appropriate data and commands, controls permanently within memory 8 would effect communication of data concurrently with the processing of other tasks. From an operators viewpoint, this would be very convenient, but it is considered that this solution would be prohibitively expensive in view of the extra memory space required.

It has now been realized that a different approach can be achieved. This approach is to place the communications session information, i.e. the setup, the send queue and associated parameters and selected options, temporarily on the communications program diskette. On re-entry to the communications task, this information is then automatically restored and the operator can continue the session from the point at which it left off.

It is for this purpose that identity i—Save Session Preparation and Go to Task Selection, has been added to the Setup Selection menu shown hereinbefore. If an operator presses the END key while the Session Summary Frame is displayed, in order to exit from a communications session, the SETUP SELECTION menu is presented to him with the currently selected setup highlighted. He can now choose either option i—Save Session Preparation and Go to Task Selection or j—Go to Task Selection. In the latter case, of course, he goes back to the original TASK SELECTION MENU, and when a further task is selected and the associated program diskette entered, his preparation work is lost. If he selects identity i, the system prompts him to insert the EDD program diskette if it is not still mounted. Then the information relating to the communication session the operator was preparing is entered into an area of the EDD diskette not containing program material. Thereafter a message indicating that the session preparation data was saved is posted, and the system returns to the TASK SELECTION menu.

When the operator subsequently selects the EDD feature task, instead of the SETUP SELECTION menu being displayed, control proceeds directly to the Session Summary frame, and the setup, the send queue and associated parameters, and the previously selected options are restored to memory 8, so the system again is in the state from which it was exited.

Figure 2:
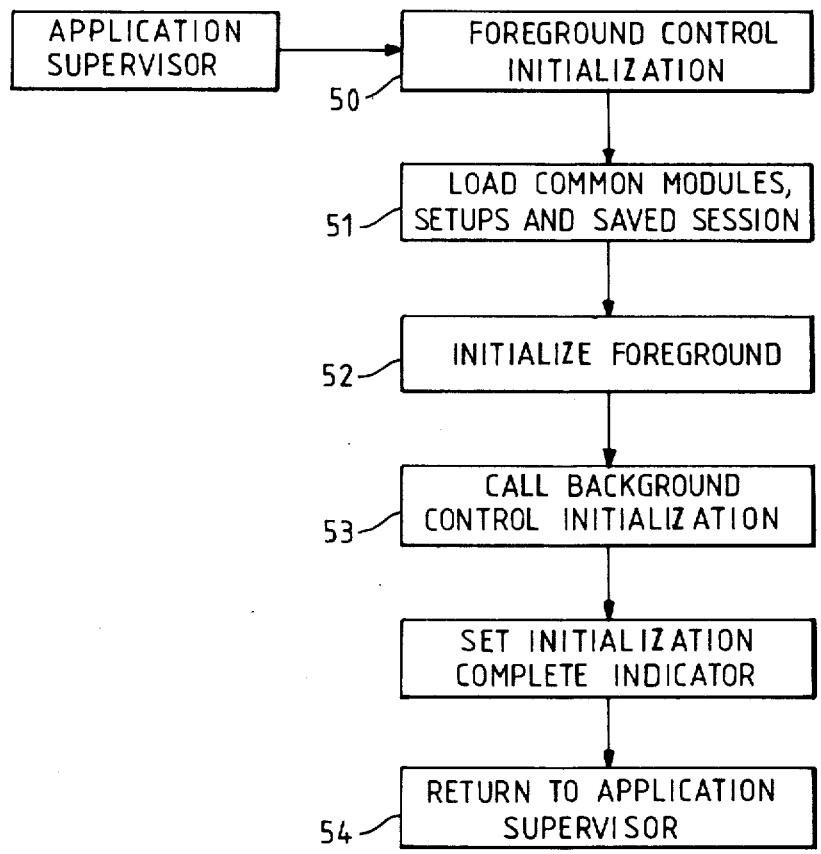
FIG. 2 through 4 are flow diagrams showing the control of the processor of FIG. 1 during a communications preparation operation.
Figure 3:
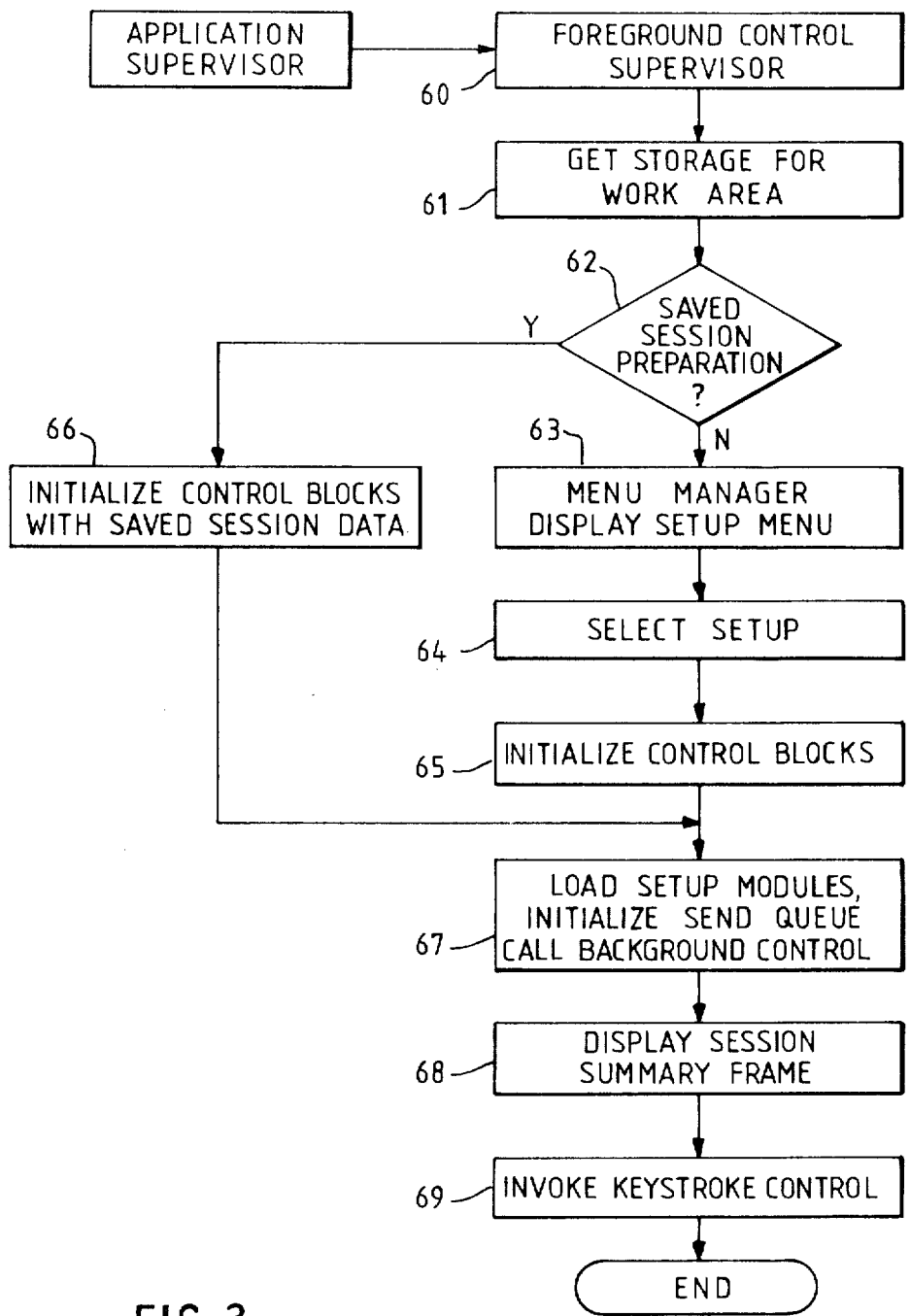
Figure 4:
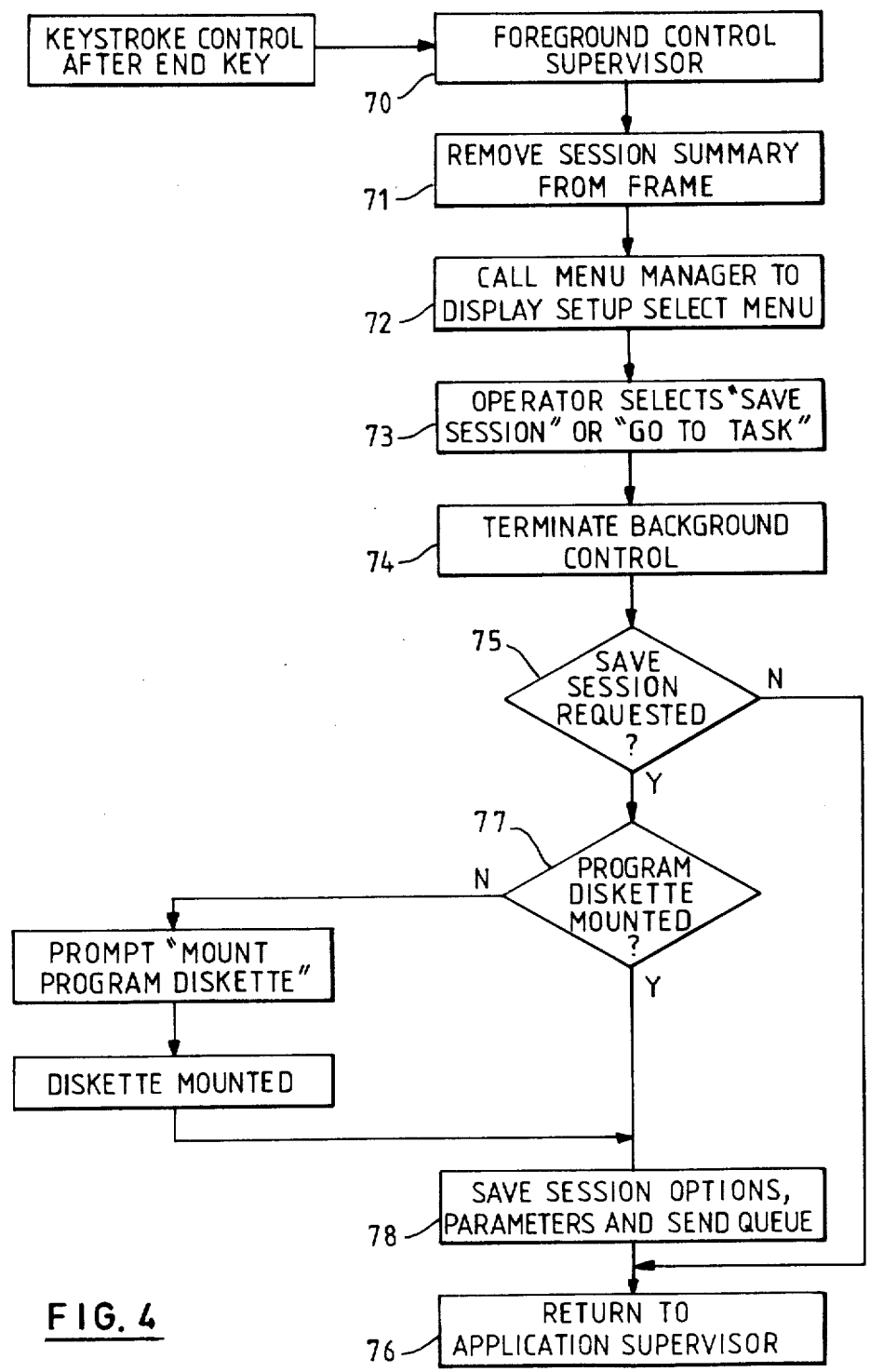

FIGS. 2, 3 and 4 are flow diagrams showing the controls which effect the saving of the communication session data. Subsequent to the operator selecting 'Features Task' from the TASK SELECTION menu and thereafter loading an EDD diskette, the Application Supervisor 22, (FIG. 1) loads the EDD foreground control initialization routine 50 (FIG. 2). This routine loads common modules, setups and saved session data (if present on the diskette) at 51. It then performs preliminary initialization at 52, invokes an EDD background control initialization routine at 53 and returns to the application supervisor at 54.

As shown in FIG. 3, the application supervisor then passes control to the foreground control supervisor routine (60) which firstly allocates a work area in storage at 61. At 62, it is determined whether or not data from a previous session has been saved, if not, the menu manager (23, FIG. 1) is called to display the SETUP SELECTION menu at 63. Thereafter after selection of a setup at 64, the control block of the Foreground Supervisor is initialized using default option data at 65. On the other hand, if data from a previous session has been saved, the control blocks are initialized with the saved data directly at 66. Thereafter the Foreground Control Supervisor completes loading of modules from the EDD data, initializes the send queue, and calls the background control to complete the initialization at 67. In the next step, the Session Summary Frame is displayed at 68, and the keystroke control (21, FIG. 1) is invoked at 69 to permit the operator to continue the session preparation.

FIG. 4 illustrates the controls which effect the saving of session data. Upon detection of the depression of the END key during a preparation session, the keystroke control calls the Foreground Control Supervisor at 70. This removes the SESSION SUMMARY frame from the display at 71, and calls the Menu Manager (23, FIG. 1) to display the SETUP SELECTION menu. At 73, the operator selects either the 'Save Session Preparation and Go to Task Selection' or 'Go to Task Selection' from the menu. Either of these choices causes the Communications Background Control (41, Fig. 1) to terminate at 74. At 75, it is determined whether the 'save session' option has been selected, if not control passes directly to the Application Supervisor (22, FIG. 1) at 76. If so, after determining at 77 whether the EDD program diskette is mounted or not, and if not, prompting the operator to mount it, the saved session parameters and send queue are read on to the diskette at 78, and control passes on to the Application Supervisor 76.

The Application Supervisor then calls a Foreground Control termination routine which deletes all the application data from memory. It then causes presentation of the TASK SELECTION menu for selection and initiation of a further task.

While the invention has been particularly shown and described with reference to a preferred embodiment thereof, it will be understood that various changes in form and detail may be made without departing from the scope of the invention as defined by the following claims.

We claim:

1. A text processor system including a main memory, communications means for transmitting messages through a communications line and a storage unit for transferring data between storage elements mountable therein and the main memory, said data including a communications control program contained on a communications control storage element and message data contained on a further storage element, and including means for developing, in the main memory, data defining a queue of messages to be communicated from the system under the control of the communications control program and means responsive to interruption of the queue data development to cause transfer of the queue data from the main memory to the communications control storage element.

2. A text processor system according to claim 1 including means operative on a recall of a communications task subsequent to its interruption to direct the transferred queue data together with the communications control program from the communications control storage element back into the main memory.

3. A text processor system according to claim 1 adapted to perform separate tasks, including communications tasks, under the control of task programs, each of which is stored on an individual storage element and each of which, when read from the storage element to the main memory, overwrites the task program previously written therein.

4. A text processing system according to claim 1 including means for instructing an operator, by way of a display device, to transfer said queue data upon interruption of the queue data development and to insert said communications control storage element into said data storage unit if it is not mounted therein.

5. A text processor system according to claim 2 adapted to perform separate tasks, including communications tasks, under the control of task programs, each of which is stored on an individual storage element and each of which, when read from the storage element to the main memory, overwrites the task program previously written therein.

6. A text processing system according to claim 2 including means for instructing an operator, by way of a display device, to transfer said queue data upon interruption of the queue data development and to insert said communications control storage element into said data storage unit if it is not mounted therein.

7. A text processing system according to claim 3 including means for instructing an operator, by way of a display device, to transfer said queue data upon interruption of the queue data development and to insert said communications control storage element into said data storage unit if it is not mounted therein.

8. A text processing system adapted to perform multiple tasks each under the control of control data contained in an individual discrete storage element mountable into a storage unit from which the control data is transferred to a main memory device, thereby overwriting control data already therein, including means for initiating a communications task wherein data representing a queue of messages to be transmitted from the system is assembled, and means responsive to an interruption of a communications task prior to its completion to transfer said data representing the queue of messages to the discrete storage element containing the control data for the communications task.

* * * * *